United States Patent
Park

(10) Patent No.: US 10,916,946 B2
(45) Date of Patent: Feb. 9, 2021

(54) ENERGY STORAGE APPARATUS

(71) Applicant: SAMSUNG SDI CO., LTD., Yongin-si (KR)

(72) Inventor: Sangsoo Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/348,434

(22) PCT Filed: Sep. 19, 2017

(86) PCT No.: PCT/KR2017/010236
§ 371 (c)(1),
(2) Date: May 8, 2019

(87) PCT Pub. No.: WO2018/088688
PCT Pub. Date: May 17, 2018

(65) Prior Publication Data
US 2020/0067315 A1 Feb. 27, 2020

(30) Foreign Application Priority Data
Nov. 9, 2016 (KR) .................. 10-2016-0148596

(51) Int. Cl.
*H01M 10/44* (2006.01)
*H02J 3/32* (2006.01)
(Continued)

(52) U.S. Cl.
CPC ............ *H02J 3/32* (2013.01); *B60L 53/22* (2019.02); *H01M 10/44* (2013.01); *H02J 7/02* (2013.01); *B60L 2210/40* (2013.01)

(58) Field of Classification Search
CPC .... B60L 2210/40; B60L 53/22; H01M 10/44; H02J 3/32; H02J 7/02
(Continued)

(56) References Cited

U.S. PATENT DOCUMENTS 6,285,572 B1   9/2001  Onizuka et al.
6,456,044 B1 * 9/2002  Darmawaskita .......... H02J 7/00
                                                                320/139
(Continued)

FOREIGN PATENT DOCUMENTS

EP   1047179 A1   10/2000
EP   2582013 A2    4/2013
(Continued)

OTHER PUBLICATIONS

International Search Report for PCT/KR2017/010236 filed on Sep. 19, 2017.
(Continued)

*Primary Examiner* — William Hernandez
(74) *Attorney, Agent, or Firm* — Lee IP Law, PC

(57) ABSTRACT

An energy storage apparatus includes: a battery system including at least one battery; a power converting unit converting input/output power characteristics of the battery system into alternating current (AC)-direct current (DC) or DC-AC; a conversion control unit controlling an operation of the power converting unit; an initial driving unit converting DC power of the battery system into AC power and supplying the AC power as power for activating the conversion control unit; and a power selecting unit detecting an output voltage of the power converting unit, selecting, based on a level of the output voltage of the power converting unit, any one of AC power output by the initial driving unit and AC power output by the power converting unit, and supplying the selected AC power as operation power of the conversion control unit.

10 Claims, 4 Drawing Sheets

(51) Int. Cl.
*B60L 53/22* (2019.01)
*H02J 7/02* (2016.01)
(58) Field of Classification Search
USPC .................................................... 307/46, 48
See application file for complete search history.

(56) References Cited

U.S. PATENT DOCUMENTS

2013/0088900 A1   4/2013   Park
2015/0137592 A1   5/2015   Kono

FOREIGN PATENT DOCUMENTS

| JP | 2013-099124 A | 5/2013 |
|---|---|---|
| JP | 2014-050243 A | 3/2017 |
| KR | 10-2000-0077045 A | 12/2000 |
| KR | 10-2011-0067858 A | 6/2011 |
| KR | 10-2012-0017930 A | 2/2012 |
| KR | 10-1369692 B1 | 2/2014 |
| KR | 10-2014-0084917 A | 7/2014 |
| KR | 10-2015-0139250 A | 12/2015 |
| KR | 10-2016-0023169 A | 3/2016 |
| KR | 10-166399 B1 | 10/2016 |

OTHER PUBLICATIONS

Korean Registration Determination Certificate dated Nov. 13, 2020.

\* cited by examiner

ENERGY STORAGE APPARATUS

CROSS-REFERENCE TO THE RELATED APPLICATION

This is the U.S. national phase application based on PCT Application No. PCT/KR2017/010236, filed Sep. 19, 2017, which is based on Korean Patent Application No. 10-2016-0148596, filed Nov. 9, 2016, the entire contents of all of which are hereby incorporated by reference.

TECHNICAL FIELD

The present disclosure relates to energy storage apparatuses.

BACKGROUND ART

An energy storage apparatus may refer to a storage apparatus that stores power when power demand is low and uses the stored power when power demand is high, thereby improving energy efficiency and stabilizing operation of a power system. Recently, with the widespread use of intelligent power grids (smart grids) and renewable energy and the emphasis on the efficiency and stability of power systems, there has been an increasing demand for energy storage apparatuses for power supply/demand control and power quality improvement. Depending on their purposes of use, energy storage apparatuses may vary in output and capacity. In order to construct a high-capacity energy storage apparatus, a plurality of battery systems may be connected in parallel to each other.

An energy storage apparatus may be connected to an external system and operate through the power of the external system. Particularly, a battery managing unit, an energy managing unit, and a power converting unit that are included in the energy storage apparatus may operate by using the power of the external system as operation power. That is, the energy storage apparatus may operate through connection with the external system.

However, recently, there has been a need to supply power through an energy storage apparatus provided in a mobile vehicle. However, when an energy storage apparatus is not connected to an external system, an additional battery and a power storage apparatus including the additional battery should be installed to drive a battery managing unit, an energy managing unit, and a power converting unit.

DESCRIPTION OF EMBODIMENTS

Technical Problem

Provided is an energy storage apparatus that may supply the initial control power of an energy managing unit, a battery managing unit, and a power converting device of an energy storage apparatus even without receiving alternating current (AC) power from an external system.

Solution to Problem

According to an aspect of the present disclosure, an energy storage apparatus includes: a battery system including at least one battery; a power converting unit converting input/output power characteristics of the battery system into alternating current (AC)-direct current (DC) or DC-AC; a conversion control unit controlling an operation of the power converting unit; an initial driving unit converting DC power of the battery system into AC power and supplying the AC power as power for activating the conversion control unit; and a power selecting unit detecting an output voltage of the power converting unit, selecting, based on a level of the output voltage of the power converting unit, any one of AC power output by the initial driving unit and AC power output by the power converting unit, and supplying the selected AC power as operation power of the conversion control unit.

According to an embodiment, the conversion control unit may operate with AC power.

According to another embodiment, when the output voltage of the power converting unit is less than or equal to a preset reference value, the power selecting unit may select and supply output power of the initial driving unit as the operation power supplied to the conversion control unit.

According to another embodiment, when receiving an activation signal, the conversion control unit may be activated by the output power of the initial driving unit to activate the power converting unit.

According to another embodiment, when the power converting unit is activated and the output voltage of the power converting unit exceeds the preset reference value, the power selecting unit may select the AC power output by the power converting unit as the operation power of the conversion control unit.

According to another embodiment, the battery may include at least one battery cell and a battery managing unit.

According to another embodiment, the energy storage apparatus may further include an energy managing unit controlling a charge/discharge by applying a control signal to the battery managing unit and controlling an output amount of the power converting unit by applying a control signal to the conversion control unit, wherein the initial driving unit may supply power for activating the energy managing unit.

According to another embodiment, when the output voltage of the power converting unit is less than or equal to a preset reference value, the power selecting unit may select and supply output power of the initial driving unit as operation power of the energy storage apparatus.

According to another embodiment, when the output voltage of the power converting unit exceeds the preset reference value, the power selecting unit may select and supply the AC power output by the power converting unit as operation power of the energy managing unit.

According to another aspect of the present disclosure, a driving method of an energy storage apparatus including a battery, a power converting unit, a conversion control unit controlling the power converting unit, and an energy managing unit includes: detecting a level of an output voltage of the power converting unit; when the level of the output voltage of the power converting unit is less than or equal to a preset reference value, providing alternating current (AC) power converted from direct current (DC) power of the battery by an initial driving unit as operation power for activating the conversion control unit; operating the power converting unit by activating the conversion control unit by an activation signal; converting DC power of the battery into AC power by the power converting unit; and when the output voltage of the power converting unit exceeds the preset reference value, supplying the AC power converted from the DC power of the battery by the power converting unit as operation power for operating the conversion control unit.

Advantageous Effects of Disclosure

According to various embodiments of the present disclosure, the initial control power of the energy managing unit, the battery managing unit, and the power converting device of the energy storage apparatus may be supplied even without receiving AC power from the external system.

MODE OF DISCLOSURE

Figure 1:
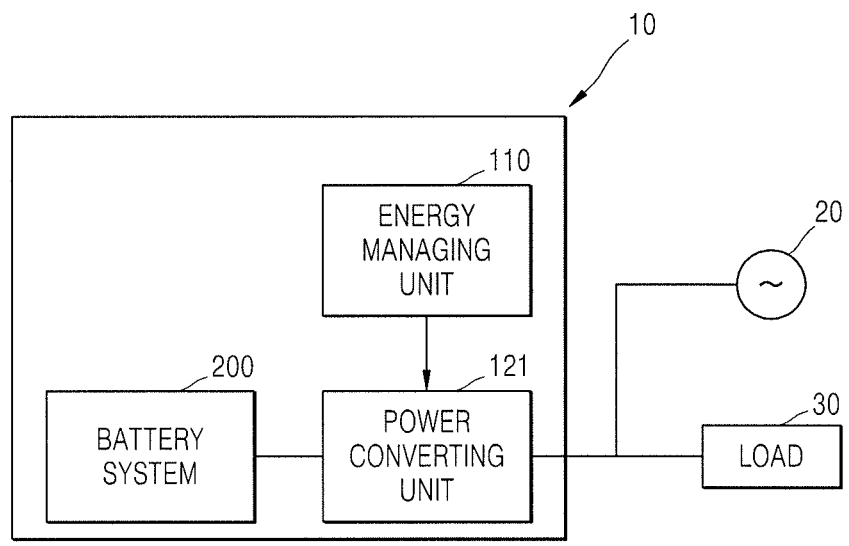
FIG. 1 illustrates a schematic configuration of an energy storage apparatus according to an embodiment.

The following detailed description of the present disclosure refers to the accompanying drawings that illustrate particular embodiments of the present disclosure. The embodiments are described in sufficient detail to enable those of ordinary skill in the art to implement the present disclosure. It will be understood that various embodiments of the present disclosure are not necessarily mutually exclusive while being different from each other.

For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims and all equivalents thereof. In the drawings, like reference numerals will denote like elements throughout various aspects. That is, particular details described herein are merely examples. Particular embodiments may vary from these example details and may still be contemplated within the spirit and scope of the present disclosure.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

FIG. 1 illustrates a schematic configuration of an energy storage apparatus according to an embodiment.

Referring to FIG. 1, an energy storage apparatus 10 may be connected to at least one of a system 20 and a load 30. The energy storage apparatus 10 may receive power from the system 20, store the power, and supply the stored power back to at least one of the system 20 and the load 30. The system (grid system) 20 may be referred to as a power grid. Although not illustrated in FIG. 1, the system 20 may include a transformer (not illustrated) and may supply power to plants or homes through the transformer. Also, although not illustrated in FIG. 1, a power generation system (not illustrated) may be connected to the system 20 and the power generated by the power generation system may be supplied to the system 20 or stored in the energy storage apparatus 10.

The energy storage apparatus 10 may include an energy managing unit 110, a power converting unit 121, and a battery system 200. The battery system 200 may include batteries 230 connected in series and/or in parallel to each other, and each of the batteries 230 may include a battery managing unit 210. The battery system 200 may be connected to the system 20 or the load 30 through the power converting unit 121.

The power converting unit 121 may convert power between the system 20 and the battery system 200. The power converting unit 121 may adjust a power conversion amount under the control of the energy managing unit 110. For example, the power converting unit 121 may convert the alternating current (AC) power of the system 20 and the direct current (DC) power of the battery system 200 into each other and may further convert the DC power of the battery system 200 into AC power to be supplied to the load 30. The power converting unit 121 may include a bidirectional inverter that converts the DC voltage of the battery system 200 and the AC voltage of the system 20 into each other.

The energy managing unit 110 may control the battery system 200 and the power converting unit 121. The energy managing unit 110 may detect the state, such as voltage, current, and temperature, of the battery system 200 and detect the state, such as voltage and current, of at least one of the system 20 and the load 30. According to external control, the energy managing unit 110 may control the power converting unit 121 and the battery system 200 to charge the energy storage apparatus 10 with the power of the system 20 or discharge the power of the energy storage apparatus 10 to at least one of the system 20 and the load 30. The energy managing unit 110 may adjust the amount of power converted by the power converting unit 121, by considering the state of the system 20 and the load 30 and the state of the battery 230 included in the battery system 200.

The battery system 200 may include at least one battery 230 and a battery managing unit 210 controlling the charge/discharge of the battery 230. The DC power output by the battery system 200 may be converted into AC power by the power converting unit 121 and then provided to the system 20 or the load 30. The power converting unit 121 may convert the AC power supplied from the external system 20 into DC power and the battery system 200 may be charged with the DC power.

The battery 230 may store power and may include at least one battery cell (not illustrated). One battery cell may be included in the battery 230 or a plurality of battery cells may be included in the battery 230, and the battery cells may be connected in series, in parallel, or in series-parallel. The number of battery cells included in the battery 230 and the connection method thereof may be determined according to the required output voltage and power storage capacity.

The battery cells may include rechargeable secondary batteries. For example, the battery cells may include nickel-cadmium batteries, lead storage batteries, nickel metal hydride batteries (NiMH), lithium ion batteries, or lithium polymer batteries, but are not limited thereto.

The battery managing unit 210 may control a switch (not illustrated) to protect the battery 230. The battery managing unit 210 may control the flow of a current flowing into or out of the battery 230 by using a switch (not illustrated). For example, the battery managing unit 210 may perform an overcharge protection function, an overdischarge protection function, an overcurrent protection function, an overvoltage protection function, an overheat protection function, a cell balancing function, and/or the like.

The battery managing unit 210 may obtain the current, the voltage, the temperature, the remaining power amount, the lifetime, the state of charge (SOC), and/or the like of the battery 230. For example, the battery managing unit 210 may measure the cell voltage and temperature of the battery cells of the battery 230 by using sensors.

Figure 2:
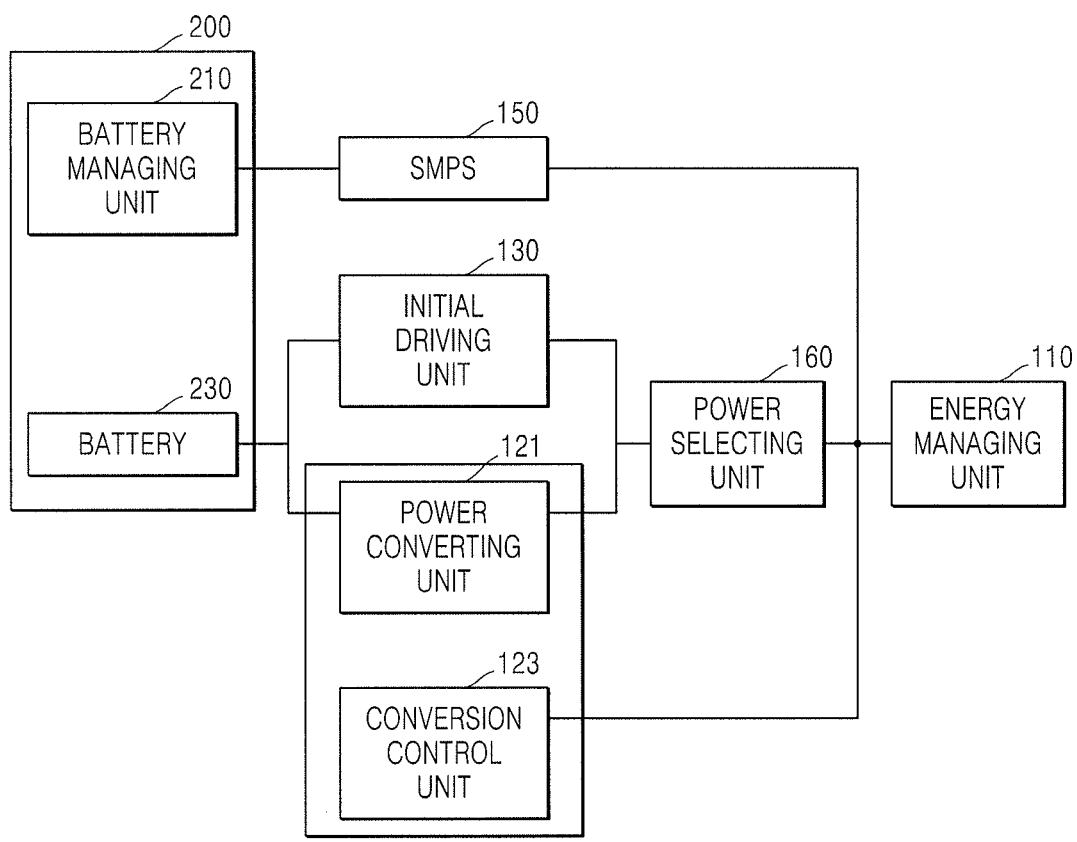
FIG. 2 is a diagram illustrating a configuration of an energy storage apparatus and a path through which control power is supplied, according to an embodiment.

FIG. 2 is a diagram illustrating a configuration of an energy storage apparatus and a path through which control power is supplied, according to an embodiment.

Referring to FIG. 2, an energy storage apparatus 10 may include a battery managing unit 210, a battery 230, a switch-mode power supply (SMPS) 150, an initial driving unit 130, a power converting unit 121, a conversion control unit 123, a power selecting unit 160, and an energy managing unit 110.

The energy storage apparatus 10 may store the power received from the system 20 as DC power, convert the stored DC power into AC power, and supply the AC power to the load 30 or the system 20. In general, the energy storage apparatus 10 may be connected to the system 20 and the load 30 while being fixed at a certain position. In this case, the energy storage apparatus 10 may receive driving power necessary to drive controllers (control devices) from a commercial power supply that is the system 20. The controllers may include the battery managing unit 210 controlling the charge/discharge of the battery 230, the conversion control unit 123 controlling the operation of the power converting unit 121, and the energy managing unit 110 controlling the charge/discharge of the battery system 200 and the amount of power converted by the power converting unit 121.

The conversion control unit 123 may control an operation of the power converting unit 121. The conversion control unit 123 may stop the operation of the power converting unit 121 or control the output voltage and current level or the power conversion amount of the power converting unit 121. Meanwhile, the conversion control unit 123 connected to the commercial power supply may operate by receiving AC power. The conversion control unit 123 may control an operation of the power converting unit 121 according to a control signal of the energy managing unit 110.

The SMPS 150 may be a DC stabilized power supply that stabilizes the output by controlling an on/off time ratio of a switch, and the SMPS 150 may receive AC power and output DC power necessary to operate the battery managing unit 210.

The initial driving unit 130 may convert the DC power of the battery system 200 into AC power. The initial driving unit 130 may include a unidirectional inverter that converts DC power into AC power. The initial driving unit 130 may supply AC power for activating the controllers. The initial driving unit 130 may have a smaller conversion capacity than the power converting unit 121. For example, the power converting unit 121 may be designed to output an AC power of 50 kW or more in order to supply power to the load 30, while the initial driving unit 130 may be designed to output only AC power for driving the controllers. For example, the initial driving unit 130 may be designed to have an output of 3 kW or less.

The power selecting unit 160 may electrically connect the controllers to any one of the power converting unit 121 and the initial driving unit 130. The power selecting unit 160 may connect the controllers to any one of the power converting unit 121 and the initial driving unit 130 to supply the AC power output by the power converting unit 121 and the initial driving unit 130 as operation power of the controllers. That is, when the power converting unit 121 and the controllers are electrically connected to each other, the power selecting unit 160 may disconnect the electrical connection between the initial driving unit 130 and the controllers, and likewise, when the initial driving unit 130 and the controllers are electrically connected to each other, the power selecting unit 160 may disconnect the electrical connection between the power converting unit 121 and the controllers.

According to an embodiment, the power selecting unit 160 may detect the output of the power converting unit 121 to select an object to supply the operation power. When the output of the power converting unit 121 is detected, the power selecting unit 160 may select the power converting unit 121 as an object to supply the operation power, and when the output of the power converting unit 121 is not detected, the power selecting unit 160 may select the initial driving unit 130 as an object to supply the operation power. That is, the power selecting unit 160 may supply the operation power to the controllers by using the power converting unit 121 as a main power supply and supply the operation power to the controllers by using the initial driving unit 130 as an auxiliary power supply. For example, when the output of the power converting unit 121 is monitored and the power converting unit 121 does not operate, the power selecting unit 160 may supply the output of the initial driving unit 130 as operation power for activating the controllers. The power selecting unit 160 may include a switch in each of a first path that is a path through which the initial driving unit 130 supplies the operation power and a second path that is a path through which the power converting unit 121 supplies the operation power. The power selecting unit 160 may control the switch to switch an object to supply the operation power.

According to an embodiment, based on the level of the output voltage of the power converting unit 121, the power selecting unit 160 may select an object to supply the operation power. When the output voltage of the power converting unit 121 is less than or equal to a preset reference value, the power selecting unit 160 may open the switch included in the second path and turn on the switch included in the first path such that the object to supply the operation power may be switched from the power converting unit 121 to the initial driving unit 130. The preset reference value may be a value for determining a case where the power converting unit 121 will fail to apply a rated voltage to the controllers. For example, when the controller requires a rated AC power of about 200 Vrms to about 240 Vrms for normal control, the preset reference value may be set to less than 200 Vrms.

Likewise, when the level of the output voltage of the power converting unit 121 exceeds the preset reference value, the power selecting unit 160 may open the switch included in the first path and turn on the switch included in the second path such that the object to supply the operation power may be switched from the initial driving unit 130 to the power converting unit 121.

For example, the power selecting unit 160 may include an automatic load transfer switch. The automatic load transfer switch may be a switch that is automatically connected to the auxiliary power supply when the main power is not supplied or the voltage of the main power is lower than or equal to a reference value, by securing dual power.

The energy managing unit 110 may detect the state, such as voltage, current, and temperature, of the battery system 200 and detect the voltage and current of the load 30 to control the conversion control unit 123 and the battery managing unit 210. The energy managing unit 110 may apply a control signal to the conversion control unit 123 such that the conversion control unit 123 may control the power converting unit 121 according to the control signal. The energy managing unit 110 may receive information such as voltage, power, and temperature from the battery managing unit 210 and apply a control signal to the battery managing unit 210 to suitably control the charge/discharge of the battery 230. The energy managing unit 110 may apply a control signal to the conversion control unit 123 and the battery managing unit 210 to control the output of the energy storage apparatus 10. Meanwhile, the energy storage apparatus 10 connected to the commercial power supply may operate by receiving AC power.

Meanwhile, the energy storage apparatus 10 may be in an idle state in order to minimize the consumption of standby power when power is stored or power supply to the load 30 is unnecessary. In the idle state, the energy storage apparatus 10 may stop the operation of the power converting unit 121 in order to minimize the consumption of standby power. When connected to the system 20, the energy storage apparatus 10 may receive AC power of the system 20 at the time of activation in the idle state to activate the conversion control unit 123, the energy managing unit 110, and the SMPS 150 (hereinafter, referred to as "controllers").

In the present disclosure according to an embodiment, even when the power of the system 20 is not supplied, the AC power may be supplied by the initial driving unit 130 and the power selecting unit 160 to activate the controllers, without additionally installing an uninterruptible power supply (UPS) or the like including a separate battery 230 for supplying AC power at the time of activation in the idle state. Particularly, when the controllers are disconnected from the system 20 to fail to receive the AC power from the system 20 and the power converting unit 121 also stops operation in the idle state, the power selecting unit 160 may electrically connect the initial driving unit 130 and the controllers to supply AC power for activation to the controllers. Particularly, in the case of a mobile energy storage apparatus that moves to a certain position to supply AC power, even when the power converting unit 121 may not supply AC power in the idle state, the energy storage apparatus 10 may receive AC power for activating the controllers through the AC power of the initial driving unit 130.

Figure 3:
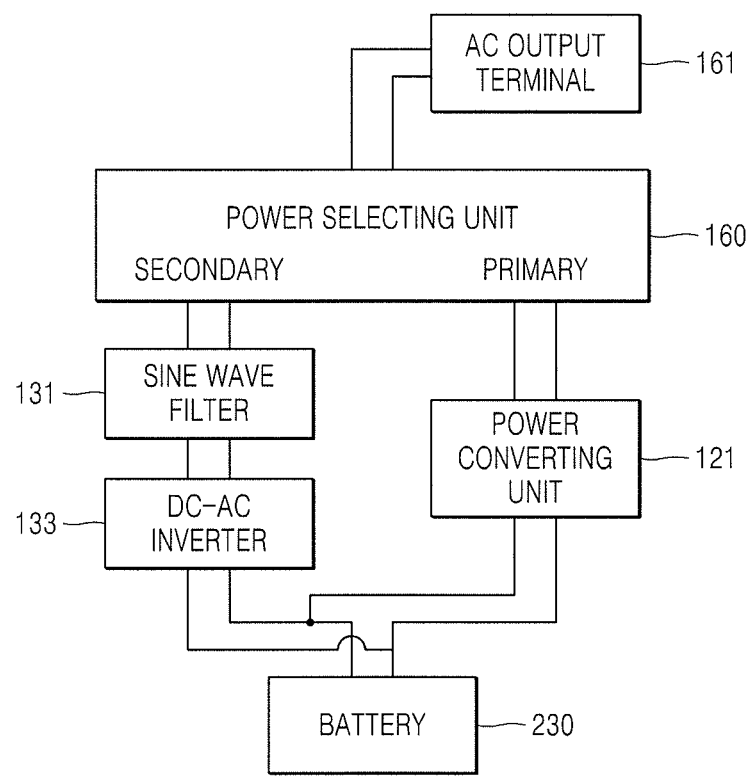
FIG. 3 is a diagram schematically illustrating a partial configuration of an energy storage apparatus according to an embodiment.

FIG. 3 is a diagram schematically illustrating a partial configuration of an energy storage apparatus according to an embodiment.

Referring to FIG. 3, an AC output terminal 161 may provide operation power of the controllers described with reference to FIG. 2. The AC output terminal 161 may provide the output of one of the initial driving unit 130 and the power converting unit 121 electrically connected according to the selection of the power selecting unit 160, to the outside.

The initial driving unit 130 may include a sine wave filter 131 and a DC-AC inverter 133. The DC-AC inverter 133 may convert a direct current (DC) into an AC square wave by using a plurality of switches. The sine wave filter 131 may filter a square wave output from the DC-AC inverter 133 to be sinusoidal AC power. The sine wave filter 131 may be a filter that filters the square wave to generate an alternating current similar to the shape of a sine wave. That is, the initial driving unit 130 may convert DC power of the battery 230 into AC power of a sine wave similar to the commercial power through the DC-AC inverter 133 and the sine wave filter 131. For example, the AC power generated by the initial driving unit 130 may be a sinusoidal AC power of 220 Vrms with a frequency of 60 Hz. That is, the initial driving unit 130 including the sine wave filter 131 and the DC-AC inverter 133 may generate sinusoidal AC power similar to the commercial power and supply the sinusoidal AC power to the controllers driven by the commercial power.

According to an embodiment, the energy storage apparatus 10 may be disconnected from the system 20 and coupled to a mobile vehicle. The energy storage apparatus 10 may supply AC power to the load 30 by directly moving to a place where the load 30 to be supplied with AC power is located. When the energy storage apparatus 10 moves to the place where the load 30 is located, it may be necessary to minimize the standby power until power is supplied to the load 30. In this case, the energy storage apparatus 10 may enter an idle state in which most functions of the power converting unit 121 and the controllers are interrupted. In this case, the power selecting unit 160 may electrically connect the initial driving unit 130 to the controllers because the output of the power converting unit 121 may not be detected. The energy storage apparatus 10 may receive or generate an activation signal to be activated in an idle state. The controllers may be activated by the AC power supplied by the initial driving unit 130.

Meanwhile, the energy storage apparatus 10 may receive an activation signal from a mobile vehicle that is an external device or may generate an activation signal through an activation signal output device (e.g., a push switch or a toggle switch) included in the energy storage apparatus 10. When the activation signal is received, the controllers may be activated by the driving power provided by the initial driving unit 130. When the power converting unit 121 is operated by the activation of the conversion control unit 123, the power selecting unit 160 may detect a voltage exceeding the preset reference value and switch the driving power for driving the controllers from the initial driving unit 130 to the power converting unit 121.

Figure 4:
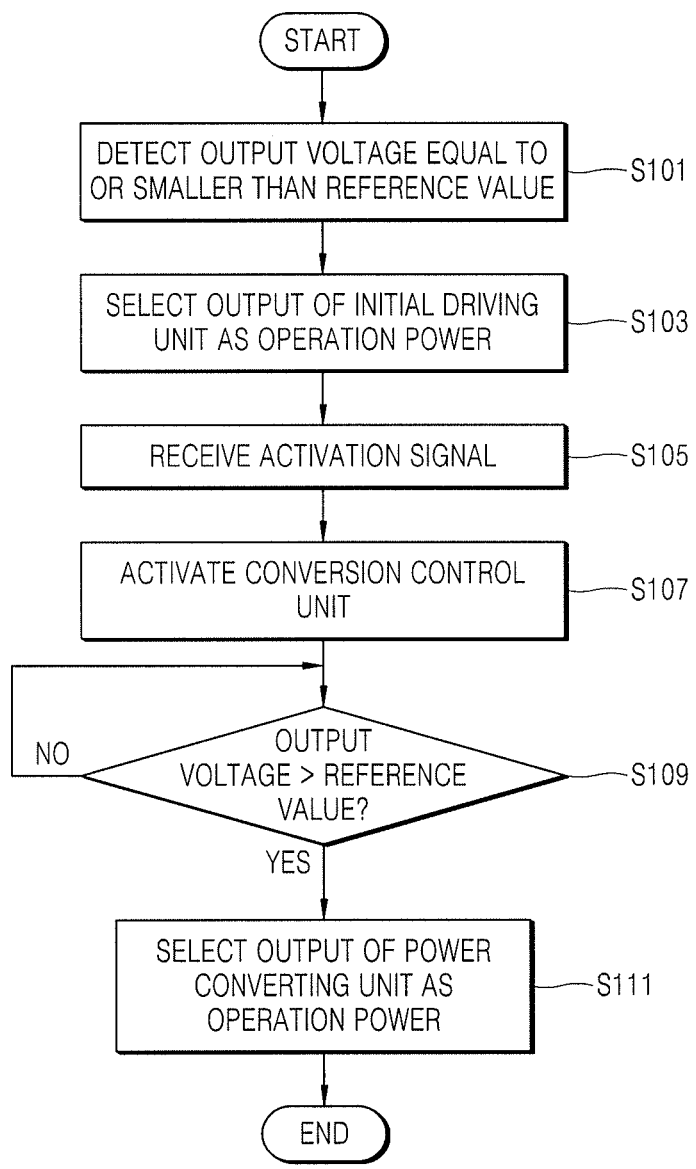
FIG. 4 is a flowchart illustrating a process in which an energy storage apparatus is activated in an idle state, according to an embodiment.

FIG. 4 is a flowchart illustrating a process in which the energy storage apparatus 10 is activated in an idle state, according to an embodiment.

The flowchart illustrated in FIG. 4 may include the operations that are sequentially processed in the energy storage apparatus 10 illustrated in FIG. 2. Thus, it will be understood that the descriptions given above with respect to the configurations illustrated in FIG. 2 may also be applied to the flowchart illustrated in FIG. 4, even though omitted from the following description.

Referring to FIG. 4, the operation of the power converting unit 121 may be stopped in the energy storage apparatus 10 that has entered an idle state. In this case, the power selecting unit 160 may detect the output voltage of the power converting unit 121 that is less than or equal to a preset reference value described with reference to FIG. 2 (operation S101).

When the output voltage of the power converting unit 121 is less than or equal to the preset reference value, the power selecting unit 160 may select the initial driving unit 130 as a power supply for supplying the driving power of the controllers described with reference to FIG. 2 and connect the initial driving unit 130 to the controllers. Meanwhile, the controllers may not operate until the activation signal is applied even when the driving power is applied by the initial driving unit 130 (operation S103).

The energy storage apparatus 10 may generate an activation signal or activate the controllers when receiving an activation signal. Particularly, the energy storage apparatus 10 may activate the controllers by using the AC power output by the initial driving unit 130 (operation S105).

When the conversion control unit 123 is activated by the activation signal and the AC power supplied by the initial driving unit 130, the conversion control unit 123 may operate the power converting unit 121. In this case, the power converting unit 121 may start to convert the DC power of the battery 230 into AC power under the control of the conversion control unit 123 (operation S107).

The power selecting unit 160 may detect AC power having a voltage level exceeding a preset reference value by the operation of the power converting unit 121 (operation S109).

When detecting the output voltage of the power converting unit 121 exceeding the preset reference value, the power selecting unit 160 may switch the operation power supplied to the controllers from the initial driving unit 130 to the power converting unit 121 (operation S111).

The present disclosure has been particularly shown and described with reference to example embodiments thereof. However, those of ordinary skill in the art will understand that various changes in form and details may be made therein without departing from the spirit and scope of the present disclosure as defined by the following claims. Therefore, the described embodiments should be considered in descriptive sense only and not for purposes of limitation. Thus, the scope of the present disclosure may be defined not by the above detailed descriptions but by the following claims, and all differences within the equivalent scope will be construed as being included in the present disclosure.

The invention claimed is:

1. An energy storage apparatus, comprising:
a battery system including at least one battery;
a power converting unit converting DC power of the battery system to output alternating current (AC) power;
a conversion control unit controlling an operation of the power converting unit;
an initial driving unit converting the DC power of the battery system to output AC power as power for activating the conversion control unit; and
a power selecting unit detecting an output voltage of the power converting unit, selecting, based on a level of the output voltage of the power converting unit, any one of the AC power output by the initial driving unit and the AC power output by the power converting unit, and supplying the selected AC power as operation power of the conversion control unit.

2. The energy storage apparatus as claimed in claim 1, wherein the conversion control unit operates with AC power.

3. The energy storage apparatus as claimed in claim 1, wherein, when the output voltage of the power converting unit is less than or equal to a preset reference value, the power selecting unit selects and supplies the AC power output by the initial driving unit as the operation power supplied to the conversion control unit.

4. The energy storage apparatus as claimed in claim 3, wherein, when receiving an activation signal, the conversion control unit is activated by the AC power output by the initial driving unit to activate the power converting unit.

5. The energy storage apparatus as claimed in claim 4, wherein, when the power converting unit is activated and the output voltage of the power converting unit exceeds the preset reference value, the power selecting unit selects the AC power output by the power converting unit as the operation power of the conversion control unit.

6. The energy storage apparatus as claimed in claim 1, wherein the battery includes at least one battery cell and a battery managing unit.

7. The energy storage apparatus as claimed in claim 6, further comprising an energy managing unit controlling a charge/discharge by applying a control signal to the battery managing unit and controlling an output amount of the power converting unit by applying a control signal to the conversion control unit,
wherein the initial driving unit supplies power for activating the energy managing unit.

8. The energy storage apparatus as claimed in claim 7, wherein, when the output voltage of the power converting unit is less than or equal to a preset reference value, the power selecting unit selects and supplies the AC power output by the initial driving unit as operation power of the energy managing unit.

9. The energy storage apparatus as claimed in claim 8, wherein, when the output voltage of the power converting unit exceeds the preset reference value, the power selecting unit selects and supplies the AC power output by the power converting unit as operation power of the energy managing unit.

10. A driving method of an energy storage apparatus including a battery, a power converting unit, a conversion control unit controlling the power converting unit, and an energy managing unit, the driving method comprising:
detecting a level of an output voltage of the power converting unit;
when the level of the output voltage of the power converting unit is less than or equal to a preset reference value, providing alternating current (AC) power converted from direct current (DC) power of the battery by an initial driving unit as operation power for activating the conversion control unit;
operating the power converting unit by activating the conversion control unit by an activation signal;
converting DC power of the battery into AC power by the power converting unit; and
when the output voltage of the power converting unit exceeds the preset reference value, supplying the AC power converted from the DC power of the battery by the power converting unit as operation power for operating the conversion control unit.

* * * * *